US007619319B1

(12) United States Patent
Hunter

(10) Patent No.: US 7,619,319 B1
(45) Date of Patent: Nov. 17, 2009

(54) NETWORK OF ENERGY GENERATING MODULES FOR TRANSFER OF ENERGY OUTPUTS

(75) Inventor: Jefferey Allen Hunter, Troy, OH (US)

(73) Assignee: F3 & I2, LLC, Troy, OH (US)

( * ) Notice: Subject to any disclaimer, the term of this patent is extended or adjusted under 35 U.S.C. 154(b) by 0 days.

(21) Appl. No.: 12/205,437

(22) Filed: Sep. 5, 2008

Related U.S. Application Data

(63) Continuation of application No. PCT/US2008/074169, filed on Aug. 25, 2008.

(60) Provisional application No. 61/080,715, filed on Jul. 15, 2008.

(51) Int. Cl.
*F02D 25/00* (2006.01)
*F02D 29/06* (2006.01)
*F01C 13/00* (2006.01)
*F01D 15/10* (2006.01)
*F02C 6/00* (2006.01)

(52) U.S. Cl. .................................................... 290/4 R

(58) Field of Classification Search .................. 290/4 R
See application file for complete search history.

(56) References Cited

U.S. PATENT DOCUMENTS

| | | | | |
|---|---|---|---|---|
| 2,598,336 A | | 5/1952 | Anderson et al. | 105/133 |
| 3,453,443 A | | 7/1969 | Stoeckly | 290/2 |
| 3,906,686 A | * | 9/1975 | Dillon | 52/79.9 |
| 4,098,077 A | | 7/1978 | Edmaier et al. | 60/272 |
| 4,136,432 A | | 1/1979 | Melley, Jr. | 29/469 |
| 4,342,921 A | | 8/1982 | Williams | 290/2 |
| 5,064,581 A | | 11/1991 | Krupp et al. | 264/29.2 |
| 5,202,617 A | | 4/1993 | Nor | 320/130 |
| 5,263,565 A | | 11/1993 | Wilkinson | 194/216 |
| 5,323,737 A | | 6/1994 | Farrell | 123/18 |
| 5,537,339 A | * | 7/1996 | Naganuma et al. | 700/276 |
| 5,583,418 A | | 12/1996 | Honda et al. | 320/109 |
| 5,675,194 A | * | 10/1997 | Domigan | 307/147 |
| 5,696,367 A | | 12/1997 | Keith | 235/381 |
| 5,847,537 A | | 12/1998 | Parmley, Sr. | 320/109 |

(Continued)

FOREIGN PATENT DOCUMENTS

JP 9306531 A 11/1997

(Continued)

OTHER PUBLICATIONS

International Search Report and Written Opinion dated Apr. 20, 2009 pertaining to International application No. PCT/US2008/074169 filed Aug. 25, 2008.

*Primary Examiner*—Nicholas Ponomarenko
*Assistant Examiner*—Pedro J Cuevas
(74) *Attorney, Agent, or Firm*—Dinsmore & Shohl LLP

(57) ABSTRACT

Embodiments of the present invention relate generally to networks of energy generating modules. More particularly, embodiments relate generally to transportable energy generating modules that are configured to generate an energy output and to transfer the generated energy output to a vehicle, a power grid, or other energy consuming or transferring device or system. One or more conditions of the energy generating modules are monitored and/or controlled by a network monitoring station. The network monitoring station is configured to evaluate one or more of the monitored conditions to determine target usages of the energy generating modules and to assign usages to the energy generating modules using target usages.

19 Claims, 9 Drawing Sheets

14
20
22
24
20

U.S. PATENT DOCUMENTS

| | | | | |
|---|---|---|---|---|
| 5,883,491 | A | 3/1999 | Silverman | 320/104 |
| 6,094,028 | A | 7/2000 | Gu et al. | 320/109 |
| 6,182,807 | B1 * | 2/2001 | Saito et al. | 191/2 |
| 6,380,637 | B1 | 4/2002 | Hsu et al. | 290/1 |
| 6,390,215 | B1 * | 5/2002 | Kodama et al. | 180/65.22 |
| 6,393,775 | B1 | 5/2002 | Staschik | 52/79.1 |
| 6,401,891 | B1 * | 6/2002 | Saito et al. | 191/2 |
| 6,408,998 | B1 * | 6/2002 | Saito et al. | 191/2 |
| 6,450,133 | B1 | 9/2002 | Bernard et al. | 123/2 |
| 6,479,973 | B2 * | 11/2002 | Saito et al. | 323/282 |
| 6,590,363 | B2 | 7/2003 | Teramoto | 320/101 |
| 6,601,542 | B2 | 8/2003 | Campion | 123/2 |
| 6,614,204 | B2 | 9/2003 | Pellegrino et al. | 320/109 |
| 6,615,118 | B2 | 9/2003 | Kumar | 701/19 |
| 6,683,389 | B2 | 1/2004 | Geis | 290/40 |
| 6,688,048 | B2 * | 2/2004 | Staschik | 52/79.1 |
| 6,765,304 | B2 * | 7/2004 | Baten et al. | 290/1 A |
| 6,769,521 | B2 * | 8/2004 | Saito et al. | 191/2 |
| 6,786,051 | B2 | 9/2004 | Kristich et al. | 60/796 |
| 6,812,586 | B2 | 11/2004 | Wacknov et al. | 290/52 |
| 6,877,581 | B2 | 4/2005 | Badr et al. | 180/311 |
| 6,973,880 | B2 | 12/2005 | Kumar | 105/35 |
| 7,028,819 | B2 * | 4/2006 | Saito et al. | 191/2 |
| 7,081,682 | B2 | 7/2006 | Campion | 290/1 |
| 7,122,913 | B2 | 10/2006 | Witten et al. | 290/1 |
| 7,183,746 | B1 | 2/2007 | Carter | 320/116 |
| 7,221,061 | B2 | 5/2007 | Alger et al. | 290/1 |
| 7,230,819 | B2 | 6/2007 | Muchow et al. | 361/601 |
| 7,261,962 | B1 | 8/2007 | Czajkowski et al. | 429/23 |
| 7,339,347 | B2 | 3/2008 | Elder et al. | 320/104 |
| 7,351,485 | B2 | 4/2008 | Shioya | 429/22 |
| 2001/0028241 | A1 * | 10/2001 | Saito et al. | 323/282 |
| 2002/0043964 | A1 * | 4/2002 | Saito et al. | 323/282 |
| 2002/0070870 | A1 * | 6/2002 | Huang | 340/685 |
| 2002/0153726 | A1 | 10/2002 | Sumner | 290/1 |
| 2002/0189173 | A1 * | 12/2002 | Staschik | 52/79.1 |
| 2003/0001434 | A1 * | 1/2003 | Saito et al. | 307/10.1 |
| 2003/0030279 | A1 | 2/2003 | Campion | 290/1 |
| 2003/0098211 | A1 * | 5/2003 | Saito et al. | 191/3 |
| 2005/0168072 | A1 * | 8/2005 | Saito et al. | 307/10.1 |
| 2006/0006652 | A1 | 1/2006 | Witten et al. | 290/1 |
| 2006/0226612 | A1 | 10/2006 | Smith et al. | 280/6.153 |
| 2006/0279976 | A1 | 12/2006 | Witten et al. | 363/157 |
| 2007/0050191 | A1 * | 3/2007 | Weider et al. | 704/275 |
| 2007/0284159 | A1 * | 12/2007 | Takami et al. | 180/65.1 |
| 2008/0053722 | A1 * | 3/2008 | O'Neill | 180/65.2 |
| 2008/0314659 | A1 * | 12/2008 | Einola et al. | 180/65.2 |
| 2009/0045773 | A1 * | 2/2009 | Pandya et al. | 320/108 |

FOREIGN PATENT DOCUMENTS

| | | | |
|---|---|---|---|
| JP | 10299576 | A | 11/1998 |
| WO | 0069773 | A1 | 11/2000 |

* cited by examiner 35
36
16B
37
16B 36
16B
37
35
35
28

NETWORK OF ENERGY GENERATING MODULES FOR TRANSFER OF ENERGY OUTPUTS

CROSS-REFERENCE TO RELATED APPLICATIONS

The present application is filed under 35 U.S.C. 111(a) as a continuation of International Patent Application No. PCT/US08/74169, which international application designates the United States and claims the benefit of U.S. Provisional Application Ser. No. 61/080,715, filed Jul. 15, 2008.

BACKGROUND

Demand for the means to electrically charge or provide fuel to motor vehicles is growing significantly for several reasons. The global economics of fossil fuels is making the direct costs associated with oil cost prohibitive for many uses and, as such, users are seeking more cost effective alternatives. Powering motor vehicles with hybrid engines, alternative fuels, and electric batteries therefore is becoming increasingly attractive from a financial standpoint. Another criterion relates to the undesirability of environmental damage caused by operating motor vehicles with fossil fuels. More environmentally friendly alternatives are becoming more highly valued and both private and public institutions are advancing research into various solutions such as hydrogen, electricity, biofuels, etc.

As it relates specifically to batteries, technological advances have developed rapidly. Improved portability and durability at lower costs are occurring at unprecedented levels. Lighter batteries, or other energy storing/distributing devices, capable of longer retaining electric power output while having lower manufacturing costs are enabling consumers to find ever more options available on the market. No matter how much this improves, however, the fact remains that energy storing/distributing devices, such as batteries, will continue to need recharging/refueling and presents a constraint to the widespread acceptability of this technology.

To date, a more commonly recognized option for consumers involves a charging system that is connected at the home or place of business. The charging system, however, is incapable of traveling with the motor vehicle. Therefore, the distance that can be ventured from the charging system is limited by the capabilities of the energy storing/distributing devices and the charging system. Though the distances that may be traveled using this and related technologies is steadily increasing, it will not be infinite. Therefore, the potential benefit to society with these technologies likewise will be limited. In addition, such charging systems generally only have power receptacles capable of charging only one vehicle at a time. Therefore, conventional charging systems are rather limited in their capabilities.

Another limitation relates to the electric power output of conventional charging systems and the amount of time required for recharging a vehicle. Conventional options require hours to complete a recharge due to the fact that the electric power output from a home is quite limited. This too limits widespread use of these technologies until a more rapid recharging option is developed and available. Another limitation involves risk associated with the municipal power grid given this is the source of electricity through the home or place of business from which the charging system derives its electric power output. Any interruptions in the power grid inevitably will interrupt the ability of users to recharge their vehicles.

SUMMARY

Embodiments of the present invention relate generally to networks of energy generating modules. More particularly, embodiments relate generally to transportable energy generating modules that are configured to generate an energy output and to transfer the energy output to a vehicle or power grid. One or more conditions of the energy generating modules are monitored and/or controlled by a network monitoring station. The network monitoring station is configured to evaluate one or more of the monitored conditions to determine target usages of the energy generating modules and to assign usages to the energy generating modules using the target usages.

In accordance with one embodiment, a network of energy generating modules comprises a plurality of energy generating modules positioned over a geographic area and a network monitoring station. The energy generating modules comprise energy generating devices, fuel chambers, and energy-transfer receptacles. The energy generating devices are in fluid communication with the fuel chambers and are configured to generate energy outputs using fuel from the fuel chambers, while the energy-transfer receptacles are configured to transfer the energy outputs to vehicles. The network monitoring station is configured to communicate with the energy generating modules to monitor one or more conditions of the energy generating modules. The network monitoring station also is configured to evaluate data representing one or more of the monitored conditions of the energy generating modules to determine target usages for the energy generating modules. The network monitoring station is configured to assign usages to the energy generating modules using the target usages.

In accordance with another embodiment, a network of energy generating modules comprises a plurality of energy generating modules positioned over a geographic area and a network monitoring station. The energy generating modules comprise energy generating devices, enclosures for the energy generating devices, fuel chambers, and energy-transfer receptacles. The enclosures comprise boom systems extendable and retractable about points of connection with exteriors of the enclosures such that the boom systems may extend and retract between positions in-line with, and conforming to, footprints of the exteriors of the enclosures and positions projecting outward from the exteriors of the enclosures. The boom systems deploy the energy-transfer receptacles when projecting outward from the exteriors of the enclosures. The energy generating modules are supported on transportable chassis such that the energy generating modules are transportable over the geographic area. The network monitoring station is configured to communicate with the energy generating modules to monitor one or more conditions of the energy generating modules.

In accordance with yet another embodiment, an energy generating module comprises an energy generating device, an enclosure for the energy generating device, a fuel chamber, a boom system, an energy-transfer receptacle, a sealable port, and a transportable chassis. The energy generating device is in fluid communication with the fuel chamber and is configured to generate an energy output using fuel from the fuel chamber. The boom system is extendable and retractable about one or more points of connection with an exterior of the enclosure such that the boom system may extend and retract between a position in-line with, and conforming to, a footprint of the exterior of the enclosure and a position projecting outward from the exterior of the enclosure. The boom system deploys the energy-transfer receptacle when projecting outward from the exterior of the enclosure. The energy-transfer receptacle is configured to transfer the energy output to vehicles. The sealable port is configured to permit introduction and withdrawal of fuel in the fuel chamber. The transportable chassis supports the energy generating module such that the energy generating module is transportable over a geographic area.

BRIEF DESCRIPTION OF THE DRAWINGS

The following detailed description of specific embodiments can be best understood when read in conjunction with the following drawings, where like structure is indicated with like reference numerals and in which.

Figure 1:
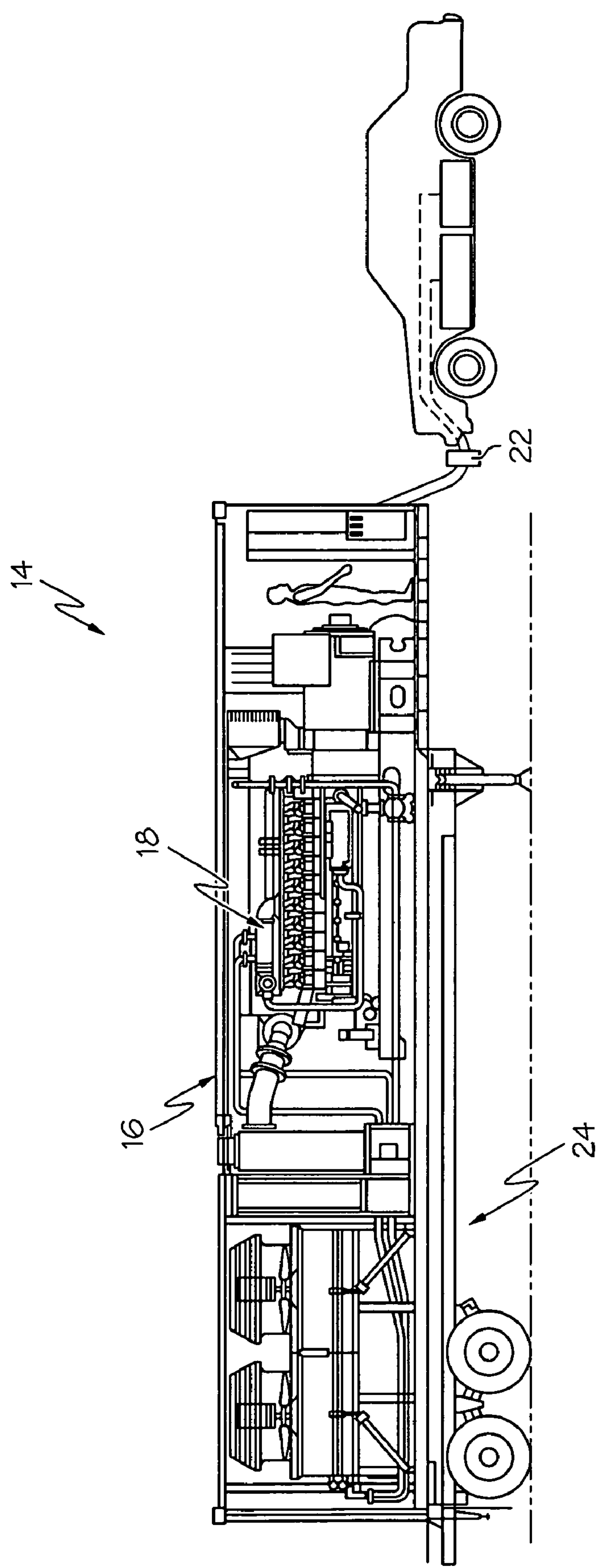
FIG. 1 is an illustration of a cross-sectional side view of an energy generating module coupled to a vehicle according to one embodiment.

The embodiments set forth in the drawings are illustrative in nature and are not intended to be limiting of the embodiments defined by the claims. Moreover, individual aspects of the drawings and the embodiments will be more fully apparent and understood in view of the detailed description.

DETAILED DESCRIPTION

Figure 5:
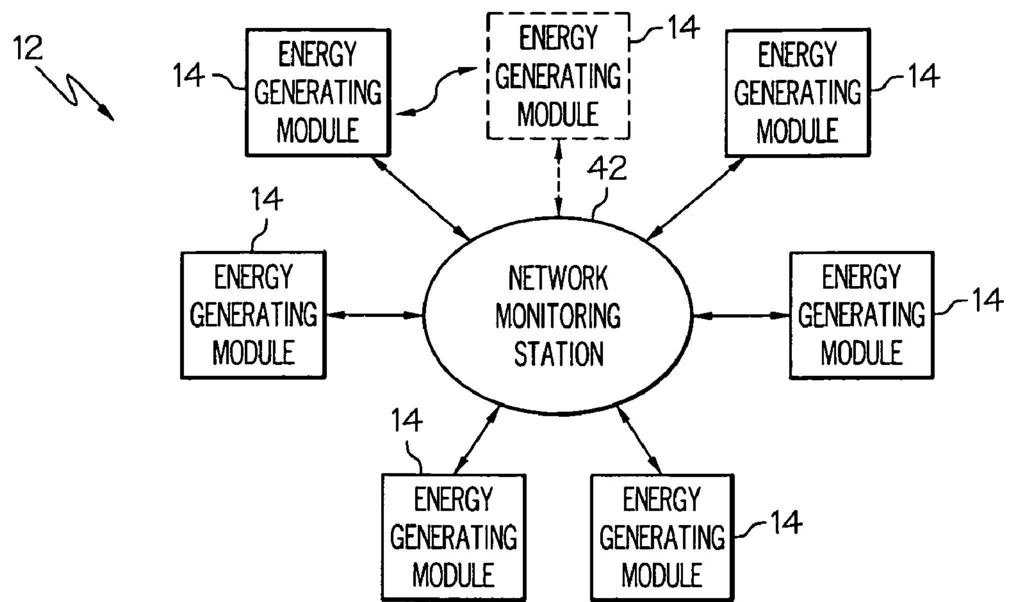
FIG. 5 is a diagram of a network of energy generating modules according to another embodiment.
Figure 6:
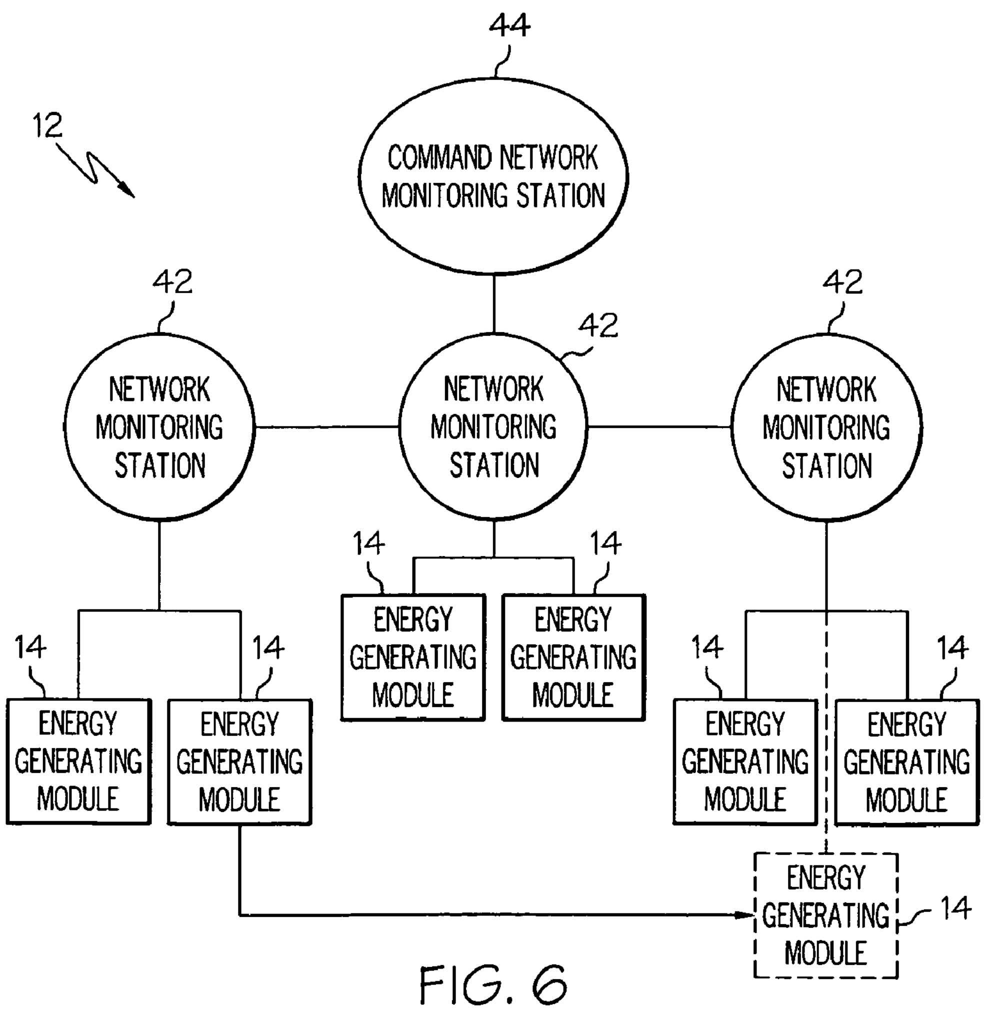
FIG. 6 is a diagram of a network of energy generating modules according to another embodiment.

Embodiments of the present invention relate generally to networks of energy generating modules. Referring initially to FIGS. 5 and 6, a network 12 of energy generating modules comprises a plurality of energy generating modules 14 positioned over a geographic area and one or more network monitoring stations 42. The energy generating modules 14 comprise energy generating devices 18 and fuel chambers 28. The energy generating devices 18 are configured to generate energy outputs using fuel from the fuel chambers 28. The energy generating modules 14 are configured to transfer the energy outputs to vehicles or other energy consuming or transferring devices or systems, such as, but not limited to power grids.

The energy generating modules 14 are assignable to various usages related to the transfer of generated energy outputs. Usages may comprise, but are not limited to, one or more of positions of energy generating modules 14 over the geographic area, times of generation and/or transfer of energy outputs by the energy generating modules 14, and transfers of the generated energy outputs to vehicles and/or power grids. The usages may be assigned according to any variety of methods or considerations. The usages also may be assigned by the network monitoring station 42 through communication with the energy generating modules 14.

The network monitoring station 42 is configured to communicate with the energy generating modules 14 to monitor one or more conditions of the energy generating modules 14. The network monitoring station 42 is further configured to evaluate data representing one or more of the monitored conditions of the energy generating modules 14 to determine target usages for the energy generating modules 14.

The conditions of the energy generating modules 14 monitored by the network monitoring station 42 may comprise any variety of conditions related to energy transfer, operation, use, performance, other conditions, and combinations thereof. In one exemplary embodiment, the conditions monitored by the network monitoring station 42 comprise energy transfer conditions of the energy generating modules 14. These energy transfer conditions may comprise one or more of any variety of conditions that relate to the generation and/or transfer of energy outputs from the energy generating modules 14 to vehicles or power grids. For example, energy transfer conditions may comprise conditions such as, but not limited to, revenues derived from energy output transfers, frequencies of energy output transfers, actual energy output transfer, potential energy output transfer, costs associated with refueling and maintenance of the energy generating modules 14, or combinations thereof. Data representing one or more of the energy transfer conditions may be evaluated by the network monitoring station 42 to determine target usages of the energy generating modules 14.

The network monitoring station 42 may be further configured to evaluate data representing one or more environmental conditions. These environmental conditions may comprise one or more of any variety of conditions that relate to environments in which the energy generating modules 14 may generate and/or transfer energy outputs. More particularly, the environmental conditions may relate to positions of the energy generating modules 14 in the geographic area and/or one or more prospective positions of the energy generating modules 14 in or beyond, so as to expand, the geographic area to determine target usages of the energy generating modules 14. The prospective positions may be any positions monitored and/or evaluated by a network monitoring station 42 for the feasibility and/or desirability for assignment of usages of energy generating modules 14 to those prospective positions. The environmental conditions may comprise, for example, conditions such as, but not limited to, traffic patterns, census data, numbers of electric-powered vehicles, payment rates of utilities for transferring energy outputs to power grids, chargeable rates for energy output transfers, space availability for positioning of energy generating modules 14 for transferring energy outputs to power grids, and space availability for positioning energy generating modules 14 for transferring energy outputs to vehicles. The positions and prospective positions may be defined, by the network monitoring station 42 or otherwise, to anywhere from a specific position to a pre-defined mile, or other distance, radius about the specific position.

Further, as mentioned above, the network monitoring station 42 is configured to assign usages to the energy generating modules 14 using the target usages. In one exemplary embodiment, the energy generating modules 14 are repositionable over the geographic area using the target usages. The target usages define positions over the geographic area appropriate for transfer of the energy outputs to vehicles, power grids, or a combination thereof. As such, an energy generating module 14 may be configured to transfer the energy outputs to vehicles and to power grids such that the energy generating modules 14 may transfer at least a portion of the energy outputs to vehicles and at least a portion of the energy outputs to power grids. The energy generating modules 14 may be configured to transfer the energy outputs to vehicles and to power grids simultaneously or independently.

The determination of the target usages that define positions of the energy generating modules 14 may correlate with positions where the energy generating module 14 may transfer an elevated amount of energy output and positions where the energy generating module 14 may earn an elevated rate per measurement of energy output transferred to vehicles and/or power grids. As such, the energy generating modules 14 may be assigned using the target usages to positions where the energy generating modules 14 may produce greater revenue due to elevated transfers of energy outputs and/or elevated rates for energy outputs to vehicles and/or power grids.

The energy generating modules 14 may be repositioned by any variety of methods or approaches. In one exemplary embodiment, the energy generating modules 14 are supported by transportable chassis, trailers, or railcars to facilitate repositioning of the energy generating modules 14. More particularly, the transportable chassis, trailers, or railcars may be coupled to vehicles, such as trucks or trains, and transported over the geographic area. It is contemplated, however, that the energy generating modules 14 may be lifted off of surfaces, by cranes or otherwise, and placed on chassis, trailers, railcars, or other supportive transportable devices such that the energy generating modules 14 are transportable.

The ability to transport the energy generating modules 14 facilitate their accessibility by vehicles as the energy generating modules 14 can be readily deployed throughout the vast network of transportable roads. The flexibility of moving the energy generating modules 14 throughout the geographic area quickly and easily from one position to another makes the network 12 highly adaptable to changes in, and demands of, the marketplace. In addition, integration of an energy generating modules 14 within railcar enclosures, or using intermodal freight railcars that carry enclosures housing energy generating modules 14, enables the energy generating modules 14 to be quickly deployed to remote job sites using conventional rails. The rail network reaches countless thousands of miles that are un-serviced by conventional roads, thereby providing added flexibility to the transportability of the energy generating modules 14.

In another exemplary embodiment of the assignment of usages when the energy generating modules 14 are configured to transfer the energy outputs to power grids, the target usages define parameters appropriate for transfer of the energy outputs to power grids. The parameters under which the energy outputs are transferred to power grids may comprise time-scheduled transfers to power grids. The time-scheduled transfers may correlate with times of elevated demand for the energy outputs by power grids, times of elevated rates for the energy outputs to power grids, times of reduced vehicle demand for the energy outputs, or combinations thereof.

The energy generating modules 14 may remain in the assigned usages until an updated target usage requiring reassignment of one or more of the energy generating modules 14 is determined by the network monitoring station 42 in light of the conditions monitored and/or evaluated by the network monitoring station 42. It is contemplated that the conditions may be monitored and/or evaluated on a continual basis or any pre-determined intermittent basis. As such, the network monitoring station 42 may determine target usages and assign usages to the energy generating modules 14 on a continual basis or any pre-determined intermittent basis.

In addition, the network monitoring station 42 may be configured to monitor one or more operating conditions of the energy generating modules 14. These operating conditions may comprise one or more of any variety of conditions that relate to the operation and/or use of the energy generating modules 14. While data representing the operating conditions generally are not evaluated by the network monitoring station 42 in determining target usages for the energy generating modules 14, it is contemplated that such data may be integrated into the network monitoring station's 42 evaluation in determining target usages. The operating conditions may comprise, for example, conditions such as, but not limited to, fuel supply data, module performance, module maintenance, module temperature, air quality, air flow, exhaust parameters, module ingress/egress data, actual and expected generated energy outputs, electrical circuit component load data, energy-transfer receptacle performance, security device performance, vending machine (when coupled to or integrated into enclosures 16 of the energy generating modules 14) operation, or combinations thereof.

Further, the network monitoring station 42 may be configured to control the energy generating modules 14. More particularly, the network monitoring station 42 may be configured to control one or more conditions of the energy generating modules 14. These controllable conditions of the energy generating modules 14 may comprise one or more of any variety of conditions that related to the operation, use, and/or security of the energy generating modules 14. The controllable conditions may comprise, for example, conditions such as, but not limited to, operation of exterior lights or interior lights, or both, operation of exterior security systems or interior security systems, or both, operation of exterior surveillance cameras or interior surveillance cameras, or both, rate of energy output generation of the energy generating devices 18, operation of the energy generating devices 18, operation of temperature-regulating devices, operation of air circulation systems, operation of exhaust systems, or combinations thereof.

In addition, the network 12, and/or the energy generating modules 14 thereof, may be linked with satellite navigation systems so as to provide vehicle operators with navigational assistance to positions of energy generating modules 14 in the geographic area. Further, the network 12 is expandable and contractible with expansion and contraction of a number of energy generating modules 14 in the network 12 and the re-assigning of energy generating modules 14 to positions over the geographic area and beyond, so as to expand the geographic area as well. It is contemplated that two or more energy generating modules 14 may be situated side-by-side or in near positions, whether on adjacent chassis, trailers, on a concrete pad or other ground surface, or on a single or multiple railway cars. The provision of multiple energy generating modules 14 in a single position may enable the continuous provision and transfer of energy output when an energy generating module 14 is inoperable due to re-fueling, maintenance, or other reason, and the simultaneous transfer of energy output, whether individually, in various combinations, or cumulatively by the multiple energy generating modules 14. Further, when situated on a single or multiple railway cars, the energy generating modules 14 may be situated side-by-side, stacked on top of each other, or both, to facilitate transportation of the energy generating modules 14 and to provide greater and/or more versatile energy output and energy output transfers with multiple energy generating modules 14.

Also, as shown in FIG. 6, a plurality of network monitoring stations 42 may be used to monitor the plurality of energy generating modules 14. For exemplary purposes only, the network 12 may be organized into geographic territories, by region or otherwise, with each territory monitored by a network monitoring station 42. The network monitoring stations 42 may be interconnected, monitored, and/or controlled, electronically or otherwise, through a network-wide command network monitoring station 44. The energy generating modules 14 and/or the interconnected network monitoring stations 42 can communicate via satellite or any other suitable inter-communication means. Also, the communication among the network monitoring stations 42 and the energy generating modules 14 may be provided via satellites, wireless systems, land-lines, other transmitters of communication, or combinations thereof. It is contemplated that the communication may be one directional, whether from the energy generating modules 14 to the network monitoring station 42 or from the network monitoring station 42 to the energy generating modules 14, or bi-directional such that both the energy generating modules 14 and the network monitoring station 42 may direct and receive communications. Further, the communication between network monitoring stations 42 and a command network monitoring station 44 likewise may be one directional or bi-directional.

Referring to FIGS. 1-4, an energy generating module 14 comprises an energy generating device 18, a fuel chamber 28, and an energy-transfer receptacle 22. The energy generating module 14 generally also comprises an enclosure 16 for the energy generating device 18 so as to protect the energy generating device 18 from environmental elements (e.g., temperature, humidity, moisture, rain, snow, wind, etc.), theft, vandalism, among other potentially damaging threats. The energy generating device 18 is in fluid communication with the fuel chamber 28 and may be configured to generate an energy output using fuel contained in the fuel chamber 28. For example, but not by way of limitation, the energy generating device 18 may be a generator engine that generates electric power output, a boiler that generates heat and/or warm air output, a chiller that generates cool air output, an air compressor that generates forced air output, or any other energy generating device configured to generate or otherwise produce an energy output.

The energy generating device 18 generally, but not necessarily, is an fuel-driven engine configured to generate an energy output, such as electric power output. The energy generating device 18 may be, for example, a turbine engine, a reciprocating engine, an electric/gasoline (or other hybrid) engine, a combined heat and power engine (CHP), which may be used to direct the heat generated by the engine to a nearby facility for a productive use, a hydrogen fuel cell engine, a solar-powered engine, or a wind-driven engine. In fact, the energy generating module 14 may comprise one or more of any combination of energy generating devices 18 to enhance flexibility and/or energy output generation of the energy generating module 14. With respect to the exemplary wind-driven engine embodiment, wind turbines, for example, may be mounted onto the enclosure 16 to generate an energy output, whether during transportation or while the energy generating module 14 is stationary. With respect to the exemplary solar-powered engine, solar panels, for example, may be provided to the roof or sides of the enclosure 16 to generate an energy output. It is contemplated that the energy generating module 14 may comprise one or more of any variety of types of energy generating devices 18 to generate one or more types of energy outputs. For exemplary purposes only, the energy generating module 14 may comprise a turbine engine, a solar-powered engine, and a boiler, the energy generating module 14 may comprise a hydrogen fuel cell engine and a turbine engine, or the energy generating module 14 may comprise an electric/gasoline engine and a biofuel engine.

Further, the energy generating module 14 may comprise a battery or other energy storing device such that energy output generated by the energy generating device 18 may be stored for transfer at a later time. It is also contemplated that kinetic energy produced by the chassis, trailers, or railcars during transportation of the energy generating module 14 may be leveraged to generate an energy output, which may be captured and stored within an energy storing device of the energy generating module 14 for later transfer. The energy output may be transferred to any device or system consuming, transferring, or otherwise utilizing the generated energy output. As used herein, "transfer" refers to a transmission, discharge, or other distribution of an energy output from the energy generating module 14 to any energy consuming or transferring device or system, such as, but not limited to, a vehicle, a battery or other energy storing device, and a power grid.

As described above, the energy generating module 14 may also comprise an enclosure for the energy generating device 18. More particularly, the enclosure 16 may be any structure having a roof, a floor, a pair of sidewalls, and a pair of endwalls that, when connected, provide a chamber-like interior capable of enclosing the energy generating device 18, and various other components associated with generating and/or transferring an energy output, and of serving as a workspace for personnel. As such, the enclosure 16 may be, for example, an ISO container, a drop-over enclosure, a railway freight car, or any other enclosure or container configured to perform the purposes described herein. The enclosure 16 may be configured of any variety of different materials, such as, but not limited to, fiberglass, aluminum, stainless steel, carbon steel, or FRP (fiberglass-reinforced plastic). While the enclosure 16 generally may be configured of carbon steel, any alternative material suitable for performing the tasks described herein and in the art may be utilized. Further, the enclosure 16 may be attached directly to a chassis to facilitate transportation of the energy generating module 14 over roads or rails.

As shown in FIGS. 7-10, the enclosure 16 of the energy generating module 14 generally comprises a plurality of exterior enclosure walls 16A and a plurality of interior enclosure walls 16B, the exterior enclosure walls 16A defining an exterior of the energy generating module 14 and the interior enclosure walls 16B defining an interior of the energy generating module 14. These exterior and interior enclosure walls 16A, 16B define, respectively, the exterior and interior roof, floor, sidewalls, and endwalls of the enclosure 16 of the energy generating module 14. While the exterior and interior enclosure walls 16A, 16B generally are linear, it is contemplated that one or more of the exterior and interior enclosure walls 16A, 16B, and/or any enclosure walls positioned therebetween, whether parallel, off-set, or perpendicular to the exterior and interior enclosure walls 16A, 16B, may be curved. Thereby, the interior of the energy generating module 14, the exterior of the energy generating module 14, or both, may assume a circular, semi-circular, or other curved shape. Curved walls may enhance the ability of the enclosure 16 to reduce the noise emanating from the energy generating device 18 that escapes the enclosure 16 to the surrounding environment. Further, curved walls may comprise one or more channels to substantially direct noise though specially designed ports to minimize the amount noise projected to the surrounding environment. The exterior and interior enclosure walls 16A, 16B, whether linear or curved, or combinations thereof, cooperate to form at least a portion of the fuel chamber 28 of the energy generating module 14, as described in greater detail herein.

Figure 4:
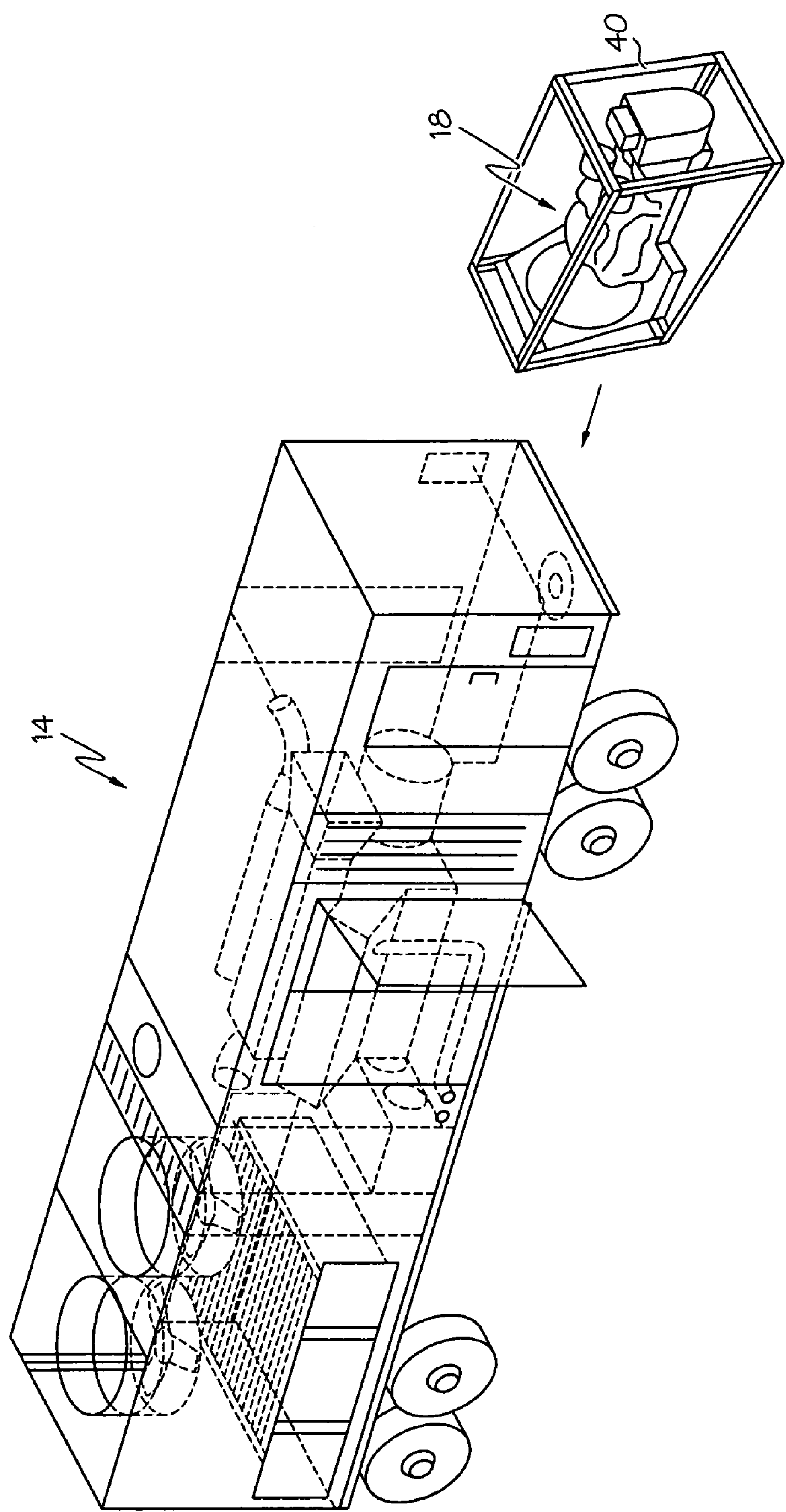
FIG. 4 is an illustration of a perspective view of a modular cage and an energy generating module according to another embodiment.
Figure 10:
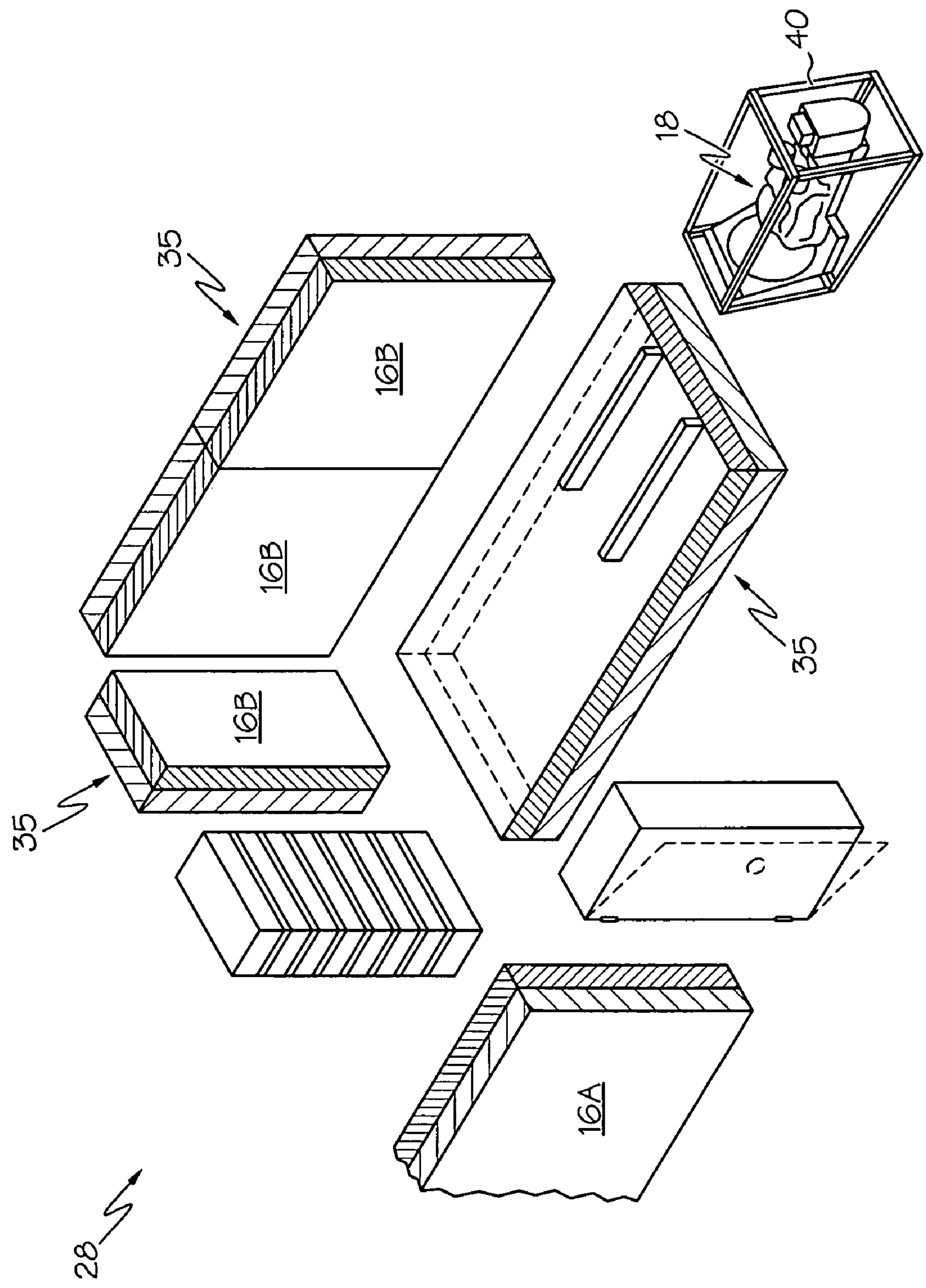
FIG. 10 is an illustration of a perspective view of an energy generating module comprising a fuel chamber according to another embodiment.

Further, the enclosure 16 may be configured to enclose and support a modular cage 40, as shown in FIGS. 4 and 10. This modular cage 40 may be configured to stably support the energy generating device 18, and possibly other components positioned within the interior of the enclosure 16, such as, but not limited to, a radiator and an alternator integrated into the energy generating device 18, during transportation of the energy generating module 14. More particularly, the energy generating device 18 may be supportedly affixed to the modular cage 40 with the assembly thereof being placed into the interior of the enclosure 16. The modular cage 40 may support the energy generating device 18 such that while the modular cage 40 is secured within the interior of the enclosure 16, the energy generating device 18 may sway within the boundaries of the modular cage 40 so as to be self-leveling with movement of the energy generating module 14 during transportation. By way of example only, the modular cage 40 may function similarly to a gyroscope in maintaining stability through adjustable self-leveling. In addition, or alternative thereto, the modular cage 40 may comprise an independent suspension within the interior of the enclosure 16 to provide self-leveling capabilities to the modular cage 40 and the energy generating device 18. As such, the modular cage 40 may protect the energy generating device 18, and any other components supported by the modular cage 40, from damage during transportation, may substantially reduce tilting of a chassis, trailer, or railcar transporting the energy generating module 14. The modular cage 40 may be designed to fit securely within, and according to the dimensions of an enclosure 16. In addition, the modular cage 40 may be designed for repeated, rapid insertion and withdrawal to and from an enclosure 16. For example, as shown in FIG. 10, one or more guide rails may be secured to the flooring of the enclosure 16 to receive and releasably lock into place the modular cage 40 supporting an energy generating device 18. Such features of the modular cage 40 permit greater flexibility of the energy generating module 14 and the use of its components, which may be interchangeable within enclosures 16 and energy generating modules 14, assuming a "plug-and-play" configuration.

The energy-transfer receptacle 22 generally is exposed, or at least accessible, along an exterior of the enclosure 16. The energy-transfer receptacle 22 is configured to transfer the energy output generated by the energy generating device 18 to an energy consuming or transferring device or system. In one exemplary embodiment, shown in FIGS. 1 and 3, the energy-transfer receptacles 22 are configured to couple to and transfer at least a portion of a an electric power output to an electric-powered vehicle. In another exemplary embodiment, the energy-transfer receptacles 22 are configured to connect to and transfer at least a portion of an electric power output to a power grid. As such, in one exemplary embodiment, an energy generating module 14 may be configured with one energy-transfer receptacle 22 configured to transfer an electric power output to vehicles and another energy-transfer receptacle 22 configured to transfer an electric power output to a power grid, simultaneously or independently. In addition, the energy generating module 14 may be configured to transfer fuel from the fuel chamber 28 to vehicles. As such, in another exemplary embodiment, an energy generating module 14 may be configured to transfer an electric power output to a vehicle, an electric power output to a power grid, and fuel to a vehicle, simultaneously or independently.

Figure 2:
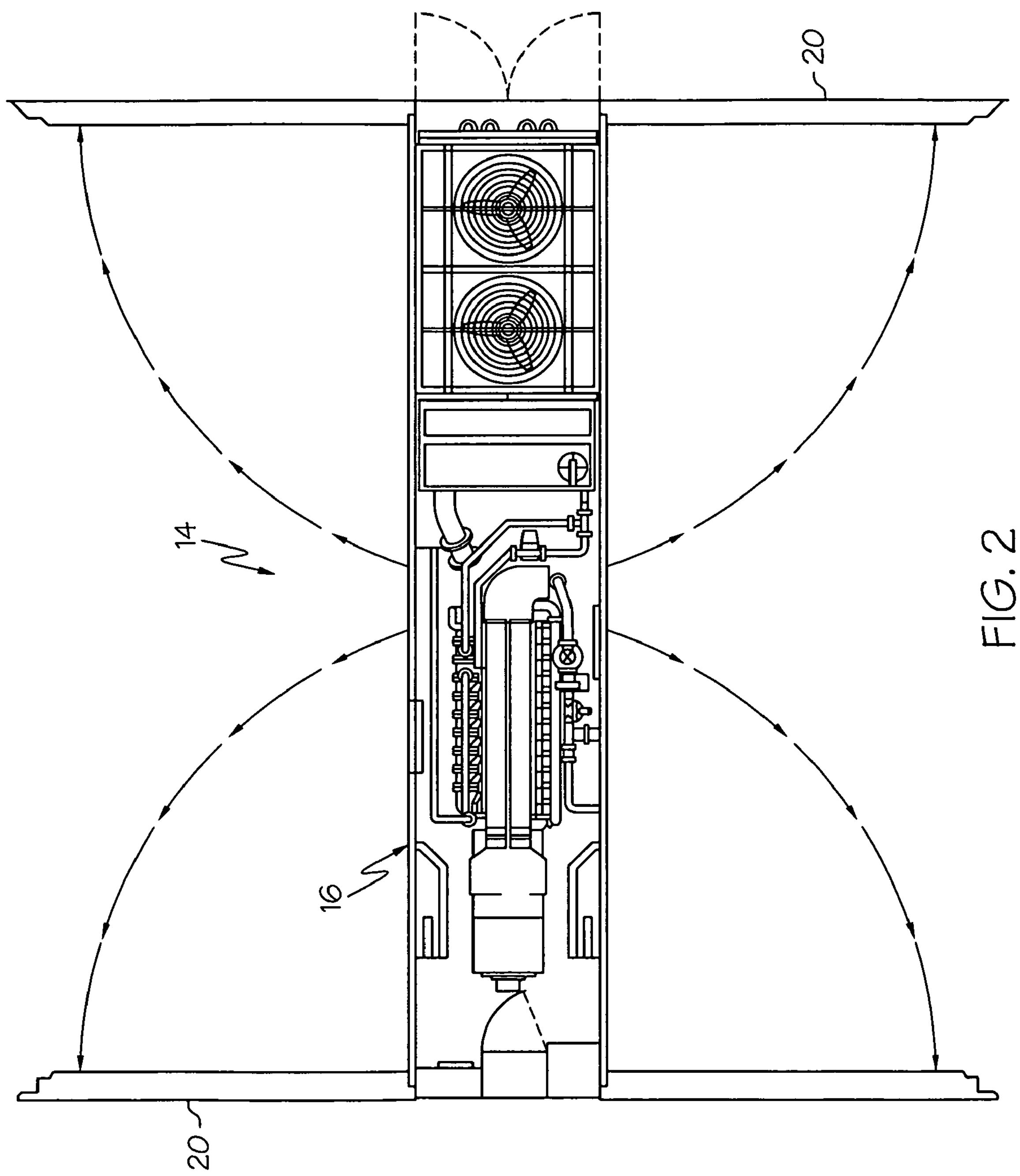
FIG. 2 is an illustration of a cross-sectional top view of an energy generating module comprising a plurality of boom systems according to another embodiment.
Figure 3:
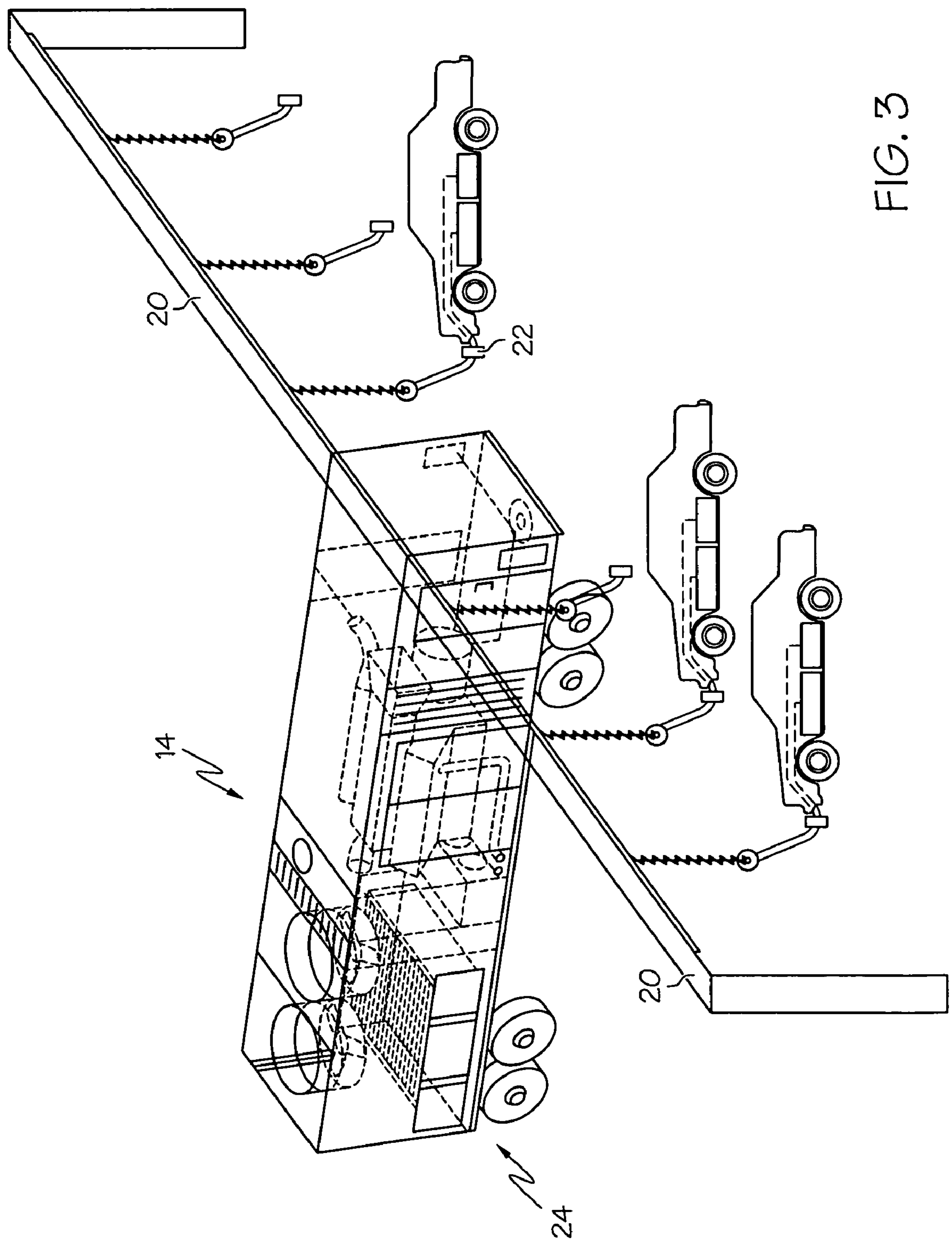
FIG. 3 is an illustration of a perspective view of an energy generating module comprising a plurality of boom systems according to another embodiment.

As shown in FIGS. 2 and 3, the energy generating module 14 also may comprise a boom system 20. The boom system 20 may support a plurality of energy-transfer receptacles 22 to enable greater transfer of energy output from the energy generating module 14. More particularly, the enclosure 16 of the energy generating module 14 may comprise a boom system 20 that is extendable from and retractable to an exterior of the enclosure 16. As such, the boom system 20 may extend and retract between retracted positions in-line with, and conforming to, footprints of the exterior of the enclosure 16 and extended positions projecting outward, angularly or perpendicularly from the exterior of the enclosure 16. The boom system 20 may deploy a plurality of energy-transfer receptacles 22 when projecting outward from the exterior of the enclosure to permit multiple, simultaneous transfers of energy output to any variety of energy consuming or transferring devices or systems. For example, one energy-transfer receptacle 22 may be coupled to a vehicle while another energy-transfer receptacle 22 may be connected to a power grid.

The boom system 20 may extend from and retract to the enclosure in any variety of ways, whether by pivoting, folding, collapsing, inserting into the enclosure 16, or otherwise, or combinations thereof. In one exemplary embodiment, the boom system 20 is pivotable about one or more points of connection with the exterior of the enclosure 16 such that the boom system 20 may pivot between retracted positions in-line with, and conforming to, footprints of the exterior of the enclosure 16 and extended positions projecting outward from the exterior of the enclosure 16. In another exemplary embodiment, the boom system 20 is telescopically extendable and retractable with respect to points of connection between the boom system 20 and the exterior of the enclosure 16. In yet another exemplary embodiment, the boom system 20 is extendable from and retractable to cavities within the exterior of the enclosure 16.

As mentioned above, the fuel chamber 28 is configured to contain fuel for use by the energy generating device 18 to generate an energy output and also for transfer to vehicles for refueling purposes. Referring to FIGS. 7-10, the fuel chambers 28 may assume any variety of configurations sufficient to perform the purposes described herein. The fuel chamber 28 of the energy generating module 14 may be configured as an intra-wall fuel chamber disposed between exterior and interior enclosure walls 16A, 16B of the enclosure 16. More particularly, the fuel chamber 28 may utilize the existing exterior and interior enclosure walls 16A, 16B (roof, floor, sidewalls, and endwalls) of the enclosure 16 of the energy generating module 14 as one or more walls of the fuel chamber 28—whether a double-walled fuel chamber or single-walled fuel chamber, as described in greater detail herein. Additional embodiments of the fuel chamber 28 are contemplated wherein the fuel chamber 28 is configured as any multiple-wall structure, whether double-wall, triple-wall, or other, that comprises a plurality of containment tanks.

In one exemplary embodiment, the fuel chamber 28 is a hermetically sealed chamber positioned within the interior of the enclosure 16. In another exemplary embodiment, shown in FIG. 8, the fuel chamber 28 may be described as a double-walled fuel chamber. Here, the fuel chamber 28 comprises a primary containment tank 30 contained within a secondary containment tank 32. The primary containment tank 30 and the secondary containment tank 32 may be separated by one or more interstitial spaces 34. The exterior enclosure walls 16A and the interior enclosure walls 16B of the enclosure 16 cooperate to form the secondary containment tank 32 of the fuel chamber 28 such that the primary containment tank 30 is disposed between the exterior enclosure walls 16A and the interior enclosure walls 16B.

Figure 7:
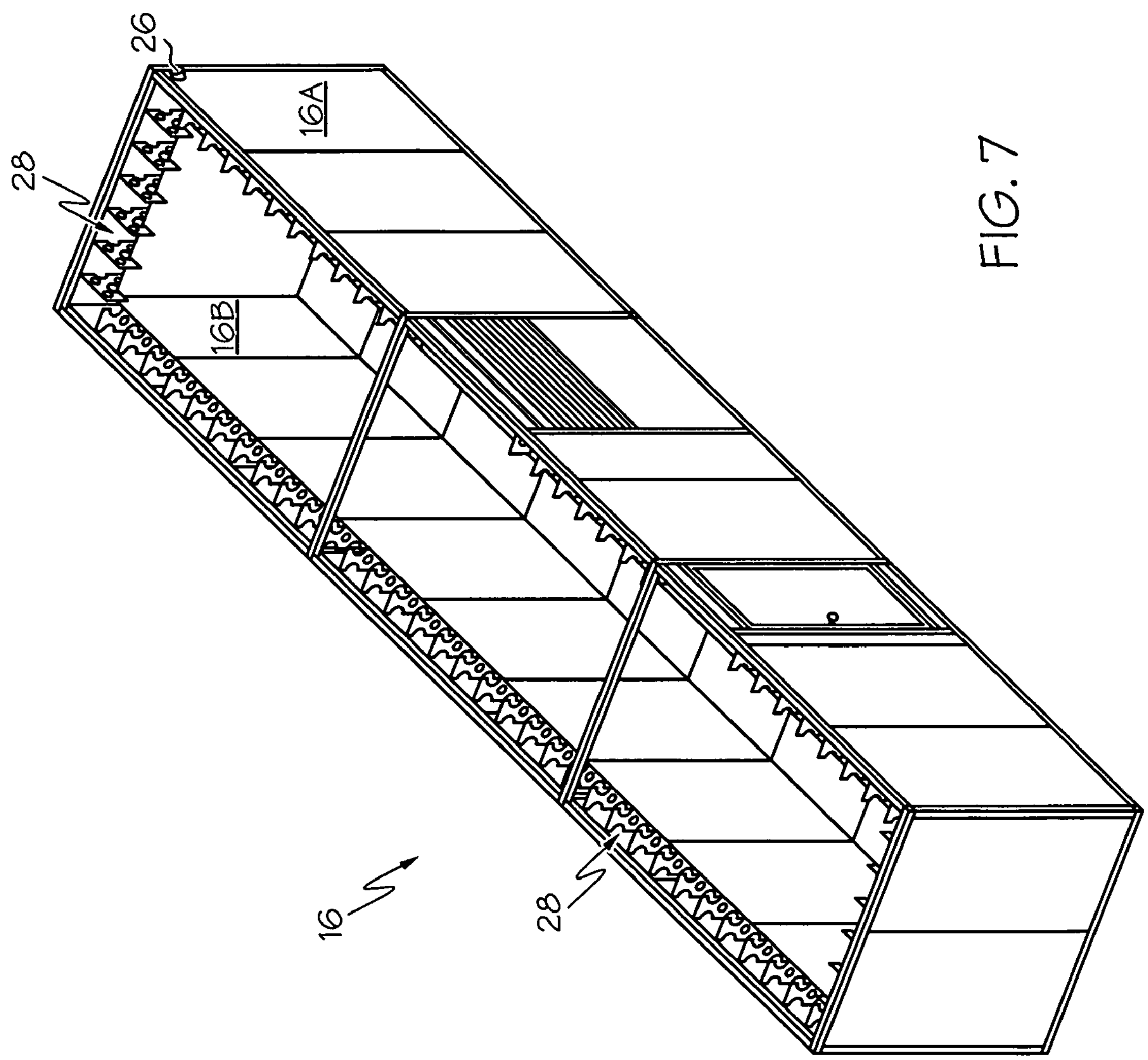
FIG. 7 is an illustration of a perspective view of an energy generating module comprising a fuel chamber according to another embodiment.

In another exemplary embodiment, shown in FIG. 7, the fuel chamber 28 may be described as a single-walled fuel chamber. Rather than the provision of the primary and secondary containment tanks 30, 32, with the secondary containment tank 32 being formed through the cooperation of the exterior and interior enclosure walls 16A, 16B, as described above, here, the exterior enclosure walls 16A and the interior enclosure walls 16B cooperate to form the fuel chamber 28 such that the fuel chamber is disposed between the exterior and interior enclosure walls 16A, 16B.

Figure 9:
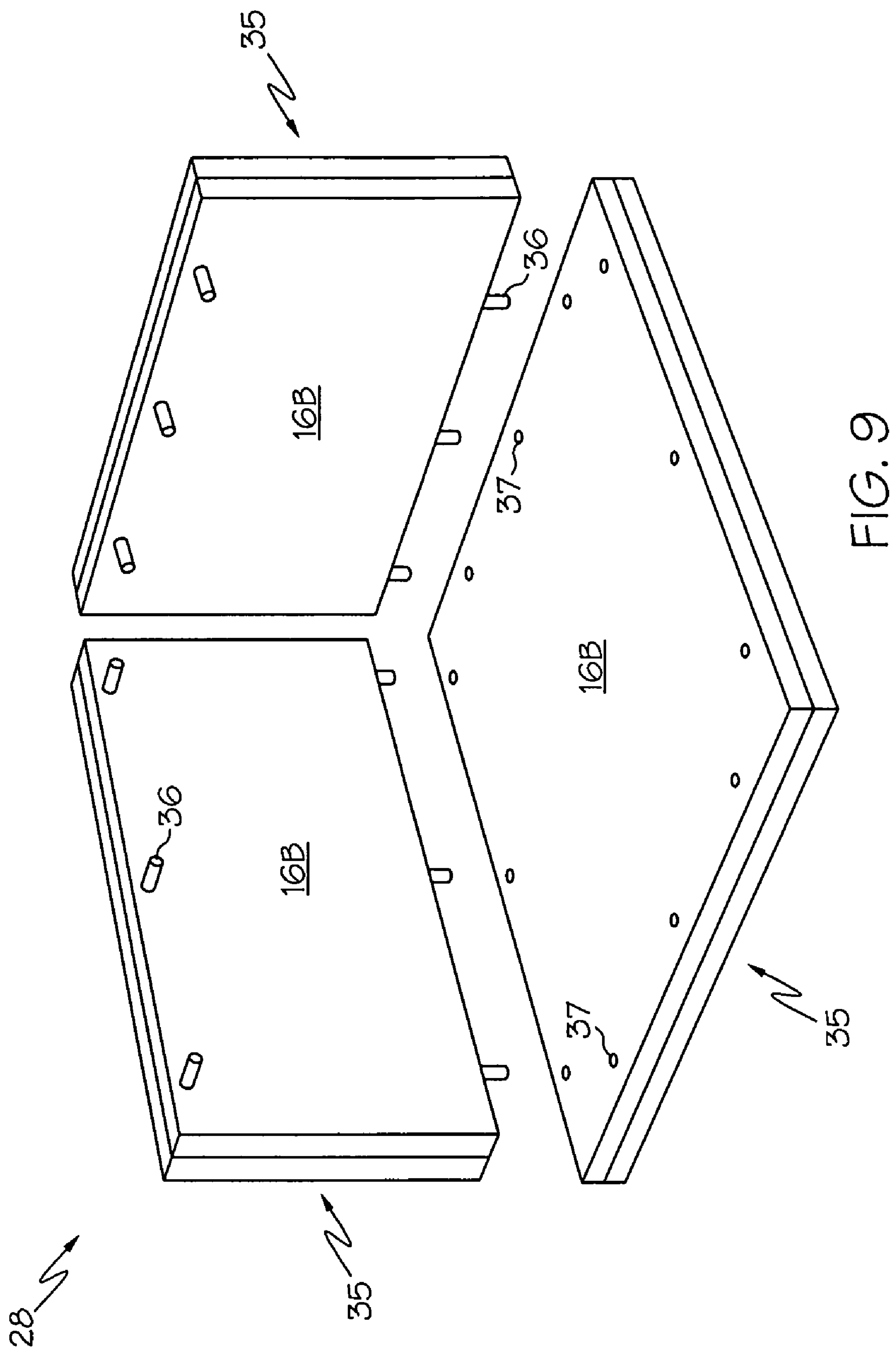
FIG. 9 is an illustration of a perspective view of an energy generating module comprising a fuel chamber according to another embodiment.

Further, in yet another exemplary embodiment of the fuel chamber 28, shown in FIGS. 9 and 10, the fuel chamber 28 may be configured as interconnecting fuel panels 35. More particularly, the fuel panels 35 may interconnect such that exterior surfaces of the interconnected fuel panels 35 cooperate to form both exterior enclosure walls 16A of the enclosure 16 and interior enclosure walls 16B of the enclosure 16. As such, the roof, the floor, the sidewalls, and the endwalls, or any combinations thereof, of the enclosure 16 may be formed by interconnected fuel panels 35.

In one exemplary embodiment, the fuel panels 35 are configured as double-wall structures that comprise primary containment tanks contained within secondary containment tanks, the primary and secondary containment tanks separated by interstitial spaces. The primary containment tanks of the fuel panels 35 may comprise one or more cells configured to contain fuel. Exterior surfaces of the secondary containment tanks of the fuel panels 35 cooperate to form exterior and interior walls of the enclosure 16 such that the fuel contained within the cells is held between the exterior and interior enclosure walls 16A, 16B. In another exemplary embodiment, the fuel panels 35 are configured as single-wall structures configured to contain fuel. Exterior surfaces of the fuel panels 35 cooperate to form exterior and interior walls of the enclosure 16 such that the fuel contained within the cells is held between the exterior and interior enclosure walls 16A, 16B.

As shown in FIG. 9, the fuel panels 35 may be configured to interconnect by a plurality of corresponding pins 36 and recesses 37. As such, pins 36 on one fuel panel 35 may insert into corresponding recesses 37 in an adjacent fuel panel 35 so as to interconnect. The pins 36 and recesses 37 may be configured to interlock such that when interconnected, the pins 36 do not withdraw from the recesses 37. Withdrawal of the pins 36 from the recesses 37 may be controlled by operation of a release mechanism or otherwise. The release mechanism may be integrated into one or more of the fuel panels 35 or may be controlled remotely from the fuel panels 35. Further, the pins 36 and recesses 37 may be configured to convey or otherwise permit passage of fuel such that fuel may flow between the interconnected fuel panels 35. Sealing devices, such as seals, gaskets, or o-rings, may be used to seal the interconnected pins 36 and recesses 37 to substantially prevent fuel from leaking from the points of interconnection. It is contemplated that the fuel panels 35 may be configured to interconnect by one or more of any varieties of connections in addition to or other than the pins 36 and recesses 37, including, but not limited to, projections and slots/grooves and dovetailing connections. Also, additional fasteners and/or connectors may be used to further secure the interconnections between the fuel panels 35.

Further the ability to interconnect the fuel panels 35 to form an enclosure 16 may permit the removal of one or more fuel panels 35 from an otherwise complete enclosure 16 should those fuel panels 35 be damaged or otherwise compromised. The removed fuel panel 35 may be replaced by another fuel panel 35 that is interconnected with the remaining fuel panels 35 forming the enclosure 16.

Figure 8:
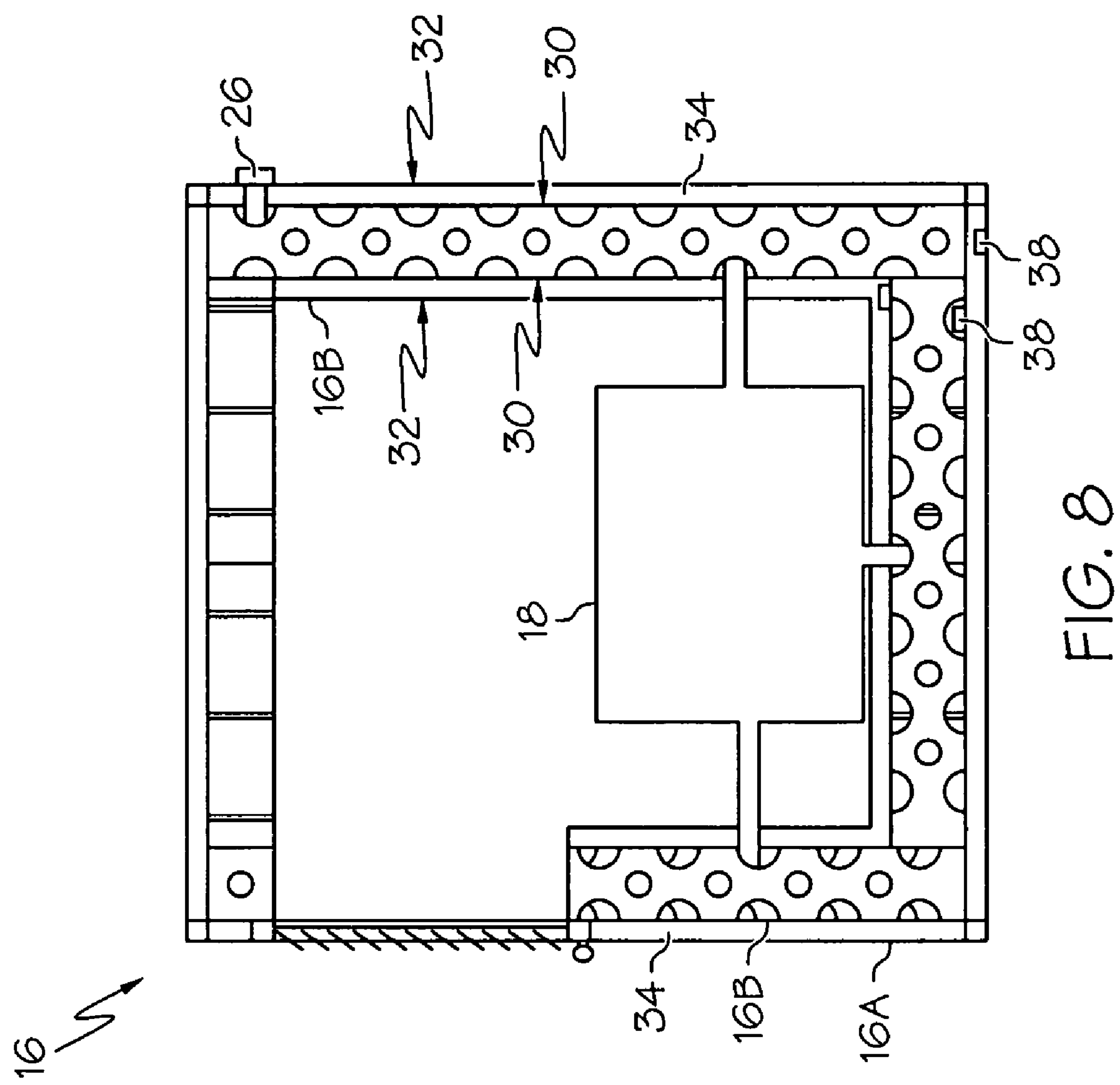
FIG. 8 is an illustration of a cross-sectional end view of an energy generating module comprising a fuel chamber according to another embodiment.

With respect to the double-walled fuel chamber 28 embodiments, an example of which is shown in FIG. 8, the primary and secondary containment tanks 30, 32 may be separated by one or more interstitial spaces 34. The width of the interstitial space 34 between the primary and secondary containment tanks 30, 32 may be determined by regulations or industry standards. While the primary containment tank 30 may be hermetically sealed to substantially preclude fuel leakage therefrom, leakage may occur due to a manufacturing defect in the energy generating module 14, a compromising of the exterior and interior enclosure walls 16A, 16B from collision with or puncturing by a foreign object, or other reason. As such, the interstitial spaces 34 may be configured to collect fuel that may leak from the primary containment tank 30. It is also contemplated that the secondary containment tank 32 may also be hermetically sealed so as to substantially preclude fuel leakage from the interstitial spaces 34 across the exterior and/or interior enclosure walls 16A, 16B.

In addition, one or more of the interstitial spaces 34 may be at least partially filled with concrete, insulation, or other matter to further attenuate noise emanating from the energy generating device 14 and to restrict the puncturing of both the primary and secondary containment tanks 30, 32 with a foreign object. This insulating matter may be further configured or provided in such a way within the interstitial spaces 34 to permit a flow of fuel therethrough so as not to obstruct fuel from appropriate sensing by the energy generating module 14, as described in greater detail below. Further, dimensions of the interstitial spaces 34 may be maintained by a brace that may be welded perpendicularly to the walls of the primary and secondary containment tanks 30, 32 (i.e. the exterior and interior enclosure walls 16A, 16B). This brace may be configured to support these walls and to allow fuel to pass therethrough should there be a leak in the primary containment tank 30.

As further shown in FIG. 8, the energy generating module 14 may comprise one or more fuel sensors 38 positioned in the interstitial spaces 34 to sense a presence of fuel therein due to a leak in the primary containment tank 30. The interstitial spaces 34 generally are configured to direct fuel collected therein to a position of the fuel sensor 38 for sensing. Also, the energy generating module 14 may comprise one or more fuel sensors 38 in the primary containment tank 30 or in the single-walled fuel chamber 28 to sense levels of fuel contained therein and to notify an operator of the energy generating module 14 of a need to re-fuel.

Also, the configuration of embodiments of the energy generating module 14 with the fuel chamber 28, and fuel contained therein, that may substantially surround the interior of the energy generating module 14, and the energy generating device 18 generally enclosed therein, may provide significant sound attenuation of the noise generated by the energy generating device 18. Thereby, baffles and/or other sound-deafening materials positioned about an exterior of a energy generating module 14 and/or the energy generating device 18, as commonly found in the art, is not needed, saving additional time, material, labor, and money involved in use and construction.

Further, the fuel chamber 28, both double-walled and single-walled embodiments, potentially provide significantly more cubic space for fuel containment given the amount of square feet along all six walls of the enclosure 16 can provide significantly more fuel capacity when compared to conventional energy generating module fuel tanks. Therefore, depending upon the rate of fuel consumption, the runtime of the energy generating module 14 in generating an energy output may increase significantly and may require far fewer re-fueling trips for a fuel tanker and manpower to re-fuel the energy generating module 14 in comparison to conventional energy generating module fuel tanks.

In addition, the fuel chamber 28 of one energy generating module 14 may be connected to the fuel chamber 28 of another nearby energy generating module 14. Thereby, a plurality of interconnected energy generating modules 14 may be provided to produce a greater, cumulative energy output than available through a single, isolated energy generating module 14. For example, but not by way of limitation, multiple adjacent energy generating modules 14 in fluid communication and all configured to and capable of sharing fuel contained in their respective fuel chambers 28 through fuel conveying devices, such as hoses, tubes, valves, clamps, etc., may be provided. Further, it is contemplated that power generating modules 14 supported on chassis, trailers, or railcars for purposes of transportation may be connected to a tanker truck or tanker railcar that may contain several thousand gallons of fuel in addition to that contained in the fuel chambers 28.

The energy generating module 14 also may comprise one or more sealable ports 26. The sealable ports 26 may be configured to permit passage of fuel across the exterior enclosure walls 16A and the primary containment tank 30, if present, for inserting or withdrawing fuel in the fuel chamber 28. The provision of multiple sealable ports 26 to the energy generating module 14 offers greater re-fueling flexibility, if access to a sealable port 26 is obstructed or otherwise prevented, and may reduce the time necessary for re-fueling. It is contemplated that where the primary containment tank 30 or the single-walled fuel chamber 28 is divided internally into multiple, independent cells, a sealable port 26 may be provided to each cell. Thereby, in such embodiments, the independent cells may be filled simultaneously with a common fuel or with various types of fuel, further reducing the time necessary to re-fuel the energy generating module 14.

In addition, fuel utilized by the energy generating module 14 and contained in the fuel chamber 28 is not limited to any particular fuel type. Rather, the fuel may be, but is not limited to, any petroleum-based fuel, such as oil, gasoline, diesel, jet fuel, kerosene, or liquefied natural gas, or any biofuel. It is also contemplated that the fuel may be a compressed or uncompressed gas such as hydrogen, propane, methane, or other gas. In fact, as mentioned above, individually sealed cells of the fuel chamber 28, if present, may contain different types of fuels. This permits not only energy output generation, but also re-fueling of vehicles that utilize various fuel types. Thereby, not only may a power grid or other electrical system be powered by energy output transferred from the energy generating module 14, but a vehicle utilizing any one of a variety of fuel types may be re-fueled with fuel in the fuel chamber 28 at the same energy generating module 14. In addition, the storage of various fuel types also enables the energy generating device 18 to use one or more of any variety of fuel types to generate energy output.

With the energy generating module 14 comprising an energy generating device 18 and a fuel chamber 28, along with other components necessary for the generation of an energy output, the energy generating module 14 is self-contained and is independent of any outside resources, with the exception of refueling the fuel chamber 28, that may be needed to generate and transfer an energy output and/or fuel. Thereby, the energy generating module 14 may operate independently of personnel, outside of occasional temporary maintenance, refueling, power grid connection/disconnection, and transportation of the energy generating module 14. Remaining operations of the energy generating module 14 may be self-performed by the energy generating modules 14 or may be controlled and/or monitored remotely by the network monitoring stations 42. With respect to the refueling of vehicles, according to one exemplary embodiment, vehicle operators may park their vehicles along side an energy generating module 14, couple fuel dispensing receptacles, or other similar devices, of the energy generating module 14 to their vehicles, and transfer energy output and/or dispense fuel from the fuel chamber 28 to the vehicle for re-energizing and/or refueling purposes. Further, the energy generating modules 14 may be configured such that vehicle operators may to transact energy output and/or fuel purchases through credit card or other payment transactions, eliminating the need for personnel on site to handle payment arrangements. For example, but not by way of limitation, vehicle operators may swipe a credit cards in a card-reading mechanism affixed to and/or linked with the energy generating module 14 to pre-pay for the energy output and/or fuel, as currently offered at most fueling stations.

Also, the energy generating module 14 generally comprises components in addition to the enclosure 16, energy generating device 18, and fuel chamber 28 that may be necessary for, or facilitative of, energy output generation. These additional components may include, but are not limited to: an alternator, a battery or other energy-storing device, DC lighting systems, electrical controls such as engine switchgear or a voltage changeover board, sound attenuation, fire suppression systems, personnel doors, fuel tank, louvers for ventilation, fan cooling system, and an exhaust system. Any combination of these items may be considered to be energy generating module 14. The exhaust system may be configured to include environmentally-friendly scrubbers to remove, or substantially remove, toxic or harmful substances from the exhaust generated by the energy generating device 18, such as NOx. Further, for construction of the energy generating module 14, the energy generating device 18, alternator, electrical controls, air circulation, exhaust systems, and other components may be manufactured in and/or provided by separate facilities. Once constructed and appropriately configured, the energy generating device 18 may be placed within the interior of the enclosure 16 of the energy generating module 14.

As shown in FIGS. 7 and 10, the energy generating module 14 may also comprise louvers for ventilation, a doorway, and a door for access to what generally is the internally enclosed energy generating device 18. More particularly, portions of the exterior and interior enclosure walls 16A, 16B of the enclosure 16 may comprise a plurality of closable louvers and a doorway for personnel to access the energy generating device 18. In addition to the louvers, the energy generating modules 14 may also comprise a fan cooling system to cool the energy generating device 18. The louvers and/or the cooling system may be configured to draw air in from a roof, ends, and/or sides of the enclosure 16. Such configurations may ensure that there is sufficient air flow to support and cool the energy generating device 18 and assist with exhaust. Further, such configurations may adequately cool an interior workspace area of the enclosure 16 to permit access by personnel.

In addition, the energy generating module 14 may comprise a retractable ladder and/or boom for personnel access and for hoisting tools, equipment, or supplies into and out of the energy generating module 14. In one exemplary embodiment, the retractable ladder and/or boom is folded and affixed to an interior of the door of the enclosure 16. Thereby, as an operator opens the door, the operator can gain access to the ladder and/or boom for easy and quick entry of the enclosure 16. More particularly, after the door is opened, the operator may unfold the ladder to lower it onto a ground surface and may lower the boom for hoisting of materials. The ladder may comprise handrails, wide step treads, and a gentle slope to enhance use thereof.

Further, the energy generating module 14 may comprise a security system. This security system may include features ranging from sounding an alarm when the energy generating module 14 has been tampered with to video surveillance to sealing of the enclosure 16 to protect from bio-hazardous or other toxic environments. For example, the energy generating module 14 may be configured to seal openings in the enclosure 16 to the outside environment, such as sealing the louvers, door jams, and exhausts. In such embodiments, the energy generating module 14 may be fully operational with self-contained air conditioning to cool the interior and the energy generating device 18 and other components and to clean and/or recirculate the exhaust gases. Such security systems may be monitored and controlled remotely by a network monitoring stations 42 and/or the energy generating module 14 may be configured to self-detect the presence of threatening environmental conditions and control the sealing and opening of the energy generating module 14 accordingly. In addition, the security system may also be used to restrict access to the interior of the power module by utilizing biometric identification systems, such as retinal, fingerprint, and facial construction scans, or touch pad, password protection systems.

While the description provided herein is primarily directed to the use of networks of energy generating modules 14 to transfer energy output and/or fuel to vehicles and power grids, it is contemplated that embodiments may also or alternatively be used to transfer energy output and/or fuel to marine vessels, aircraft, or any other energy consuming craft, vessel, or vehicle. For example, an energy generating module 14 may be positioned on or near a dock or port where the energy generating module 14, such as one comprising a boom system 20, is used to transfer energy output and/or fuel to one or more marine vessels.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally" and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A network of energy generating modules, the network comprising a plurality of energy generating modules positioned over a geographic area and a network monitoring station, wherein:

the energy generating modules comprise energy generating devices, fuel chambers, and energy-transfer receptacles;

the energy generating devices are in fluid communication with the fuel chambers and are configured to generate energy outputs using fuel from the fuel chambers;

the energy-transfer receptacles are configured to transfer the energy outputs to vehicles;

the network monitoring station is configured to communicate with the energy generating modules to monitor one or more conditions of the energy generating modules;

the network monitoring station is configured to evaluate data representing one or more of the monitored conditions of the energy generating modules to determine target usages for the energy generating modules; and the network monitoring station is configured to assign usages to the energy generating modules using the target usages.

2. The network of energy generating modules of claim 1, wherein:

the energy generating modules are repositionable over the geographic area; and the target usages define positions over the geographic area appropriate for transfer of the energy outputs to vehicles, power grids, or a combination thereof.

3. The network of energy generating modules of claim 2, wherein the energy generating modules are further configured to transfer the energy outputs to power grids such that the energy generating modules may transfer at least a portion of the energy outputs to vehicles and at least a portion of the energy outputs to power grids.

4. The network of energy generating modules of claim 1, wherein:

the energy generating modules are configured to transfer the energy outputs to power grids; and the target usages define parameters appropriate for transfer of the energy outputs to power grids.

5. The network of energy generating modules of claim 4, wherein the parameters under which the energy outputs are transferred to power grids comprise time-scheduled transfers to power grids.

6. The network of energy generating modules of claim 5, wherein the time-scheduled transfers correlate with times of elevated demand for the energy outputs by power grids, times of elevated rates for the energy outputs to power grids, times of reduced vehicle demand for the energy outputs, or combinations thereof.

7. The network of energy generating modules of claim 1, wherein:

the conditions monitored by the network monitoring station comprise energy transfer conditions, and data representing one or more of the energy transfer conditions is evaluated by the network monitoring station to determine target usages of the energy generating modules.

8. The network of energy generating modules of claim 7, wherein the network monitoring station is further configured to evaluate data representing one or more environmental conditions corresponding to positions of the energy generating modules in the geographic area, prospective positions of the energy generating modules in the geographic area, or a combination thereof.

9. The network of energy generating modules of claim 1, wherein the conditions monitored by the network monitoring station comprise module operating conditions.

10. The network of energy generating modules of claim 1, wherein the network monitoring station is further configured to control the energy generating modules.

11. The network of energy generating modules of claim 1, wherein the network is linked with one or more satellite navigation systems so as to provide vehicle operators with navigational assistance to the positions of energy generating modules in the geographic area.

12. The network of energy generating modules of claim 1, wherein the network is expandable and contractible with expansion and contraction of a number of energy generating modules in the network and with assignment of usages of the energy generating modules over the geographic area.

13. The network of energy generating modules of claim 1, wherein the network comprises a plurality of network monitoring stations monitored by one or more command network monitoring stations.

14. The network of energy generating modules of claim 1, wherein the communication between the network monitoring station and the energy generating modules is provided via satellites, wireless systems, land-lines, other transmitters of communication, or combinations thereof.

15. The network of energy generating modules of claim 1, wherein the energy generating modules are configured to transfer fuel from the fuel chambers to vehicles.

16. The network of energy generating modules of claim 1, wherein:

the energy generating modules comprise enclosures for the energy generating devices;

the enclosures comprise boom systems extendable from and retractable to exteriors of the enclosures such that the boom systems may extend and retract between positions in-line with, and conforming to, footprints of the exteriors of the enclosures and positions projecting outward from the exteriors of the enclosures, and the boom systems deploy a plurality of energy-transfer receptacles when projecting outward from the exteriors of the enclosures.

17. The network of energy generating modules of claim 16, wherein:

the boom systems are pivotable about one or more points of connection with the exteriors of the enclosures such that the boom systems may pivot between retracted positions in-line with, and conforming to, footprints of the exteriors of the enclosures and extended positions projecting outward from the exteriors of the enclosures, the boom systems are telescopically extendable and retractable with respect to points of connection between the boom systems and the exteriors of the enclosures, the boom systems are extendable from and retractable to cavities within exteriors of the enclosures, or combinations thereof.

18. A network of energy generating modules positioned over a geographic area, the network comprising a plurality of energy generating modules and a network monitoring station, wherein:

the energy generating modules comprise energy generating devices, enclosures for the energy generating devices, fuel chambers, and energy-transfer receptacles;

the energy generating devices are in fluid communication with the fuel chambers and are configured to generate energy outputs using fuel from the fuel chambers;

the enclosures comprise boom systems extendable and retractable about points of connection with exteriors of the enclosures such that the boom systems may extend and retract between positions in-line with, and conforming to, footprints of the exteriors of the enclosures and positions projecting outward from the exteriors of the enclosures;

the boom systems deploy the energy-transfer receptacles when projecting outward from the exteriors of the enclosures;

the energy-transfer receptacles are configured to transfer the energy outputs to vehicles;

the energy generating modules are supported on transportable chassis such that the energy generating modules are transportable over the geographic area; and the network monitoring station is configured to communicate with the energy generating modules to monitor one or more conditions of the energy generating modules.

19. An energy generating module comprising an energy generating device, an enclosure for the energy generating device, a fuel chamber, a boom system, an energy-transfer receptacle, a sealable port, and a transportable chassis, wherein:

the energy generating device is in fluid communication with the fuel chamber and is configured to generate an energy output using fuel from the fuel chamber;

the boom system is extendable and retractable about one or more points of connection with an exterior of the enclosure such that the boom system may extend and retract between a position in-line with, and conforming to, a footprint of the exterior of the enclosure and a position projecting outward from the exterior of the enclosure;

the boom system deploys the energy-transfer receptacle when projecting outward from the exterior of the enclosure;

the energy-transfer receptacle is configured to transfer the energy output to vehicles;

the sealable port is configured to permit introduction and withdrawal of fuel in the fuel chamber; and the transportable chassis supports the energy generating module such that the energy generating module is transportable over a geographic area.

* * * * *